United States Patent
Reynolds et al.

(10) Patent No.: US 6,215,299 B1
(45) Date of Patent: Apr. 10, 2001

(54) LINEAR POSITION SENSOR HAVING A PERMANENT MAGNET THAT IS SHAPED AND MAGNETIZED TO HAVE A FLUX FIELD PROVIDING A SENSOR OUTPUT THAT VARIES LINEARLY BETWEEN OPPOSITE END POINTS OF RELATIVE LINEAR MOVEMENT BETWEEN THE MAGNET AND SENSOR

(75) Inventors: David William Reynolds, Port Lincoln; Dmitri Konson, Mitcham; David Mark Swindon, Glenelg, all of (AU)

(73) Assignee: Britax Rainsfords Pty. Limited, Lonsdale (AU)

( * ) Notice: Subject to any disclaimer, the term of this patent is extended or adjusted under 35 U.S.C. 154(b) by 0 days.

(21) Appl. No.: 09/166,361

(22) Filed: Oct. 5, 1998

(30) Foreign Application Priority Data

Oct. 3, 1997 (GB) .................................................. 9720911

(51) Int. Cl.⁷ ........................................................ G01B 7/14
(52) U.S. Cl. .................................. 324/207.2; 324/207.22; 324/207.24; 335/302
(58) Field of Search ........................... 324/207.2, 207.22, 324/207.24; 338/32 H; 335/205, 207, 302, 306

(56) References Cited

U.S. PATENT DOCUMENTS

| 4,107,604 | 8/1978 | Bernier | ................................ 324/208 |
|---|---|---|---|
| 4,268,814 | * 5/1981 | Henrion et al. | ..................... 338/32 H |
| 5,159,268 | 10/1992 | Wu . | |
| 5,493,216 | 2/1996 | Asa . | |
| 5,955,881 | * 9/1999 | White et al. | ..................... 324/207.24 |

FOREIGN PATENT DOCUMENTS

| 1339956 | 1/1964 | (FR) . |
|---|---|---|
| 1109220 | 4/1968 | (GB) . |

OTHER PUBLICATIONS

European Search Report of European Patent Application No. EP 98 30 7998.

* cited by examiner

Primary Examiner—Walter E. Snow
(74) Attorney, Agent, or Firm—Jones, Day, Reavis & Pogue

(57) ABSTRACT

A sensor system for measuring linear displacement of a first member relative to a second member, includes an analogue Hall Effect sensor secured to the first member in an orientation to sense magnetic flux in a sensing direction perpendicular to said direction of relative movement, and a permanent magnet secured to the second member and having a front surface facing the Hall Effect sensor and extending along the direction of relative movement between the first and second members. The permanent magnet is magnetized so that the front surface has a first magnetic pole of a first magnetic polarity at a first end and a second magnetic pole of a second magnetic polarity at a second end spaced from the first end in the direction of travel.

23 Claims, 3 Drawing Sheets

LINEAR POSITION SENSOR HAVING A PERMANENT MAGNET THAT IS SHAPED AND MAGNETIZED TO HAVE A FLUX FIELD PROVIDING A SENSOR OUTPUT THAT VARIES LINEARLY BETWEEN OPPOSITE END POINTS OF RELATIVE LINEAR MOVEMENT BETWEEN THE MAGNET AND SENSOR

BACKGROUND OF THE INVENTION

This invention relates to a sensor system for measuring linear displacement of a first member relative to a second member, comprising an analogue Hall Effect sensor secured to the first member in an orientation to sense magnetic flux in a sensing direction perpendicular to said direction of a relative movement, and a permanent magnet secured to the second member and having a front surface facing the Hall Effect sensor and extending along the direction of relative movement between the first and second members.

An analogue Hall Effect sensor produces an output voltage related to the component of the flux density of a magnetic field in which it is located which is perpendicular to its sensing surface. The sensor produces zero output voltage when subject to a magnetic field of sufficient strength in one direction and its maximum output voltage when subject to a magnetic field of the same magnitude in the opposite direction. In the absence of a magnetic field, the sensor produces an output voltage of half its maximum voltage.

GB-A-1109220 disclosed a sensor system of this type in which the front surface is concave in the direction of relative movement so that the magnetic flux at the Hall Effect sensor has a minimum value when the latter is positioned opposite a central location at which the concavity of the surface has maximum depth. A second Hall Effect sensor is mounted adjacent to the first sensor for simultaneous movement therewith. The outputs of the two sensors are combined electronically in order to determine the side of the central location on which the sensors are located.

SUMMARY OF THE INVENTION

According to the invention, in a sensor system of the type described above, the permanent magnet is magnetized so that the front surface has a first magnetic pole of a first magnetic polarity at a first end and a second magnetic pole of a second magnetic polarity at a second end spaced from the first end in the direction of travel.

With this arrangement, the Hall Effect sensor is exposed to a magnetic field which changes polarity as the first and second members pass through a relative position in the center of their range. Consequently, the sensor can be arranged to produce its full range of output voltages, thus maximizing the resolution obtained.

Preferably, the front surface is concave extending along the direction of relative movement between the first and second members and is shaped to cause the magnetic field to vary. The Hall Effect sensor is responsive to the component or normalized vector of the magnetic flux produced by the magnetic field that extends perpendicular to the direction of relative movement between the magnet and sensor. The concave front surface is shaped such that the density of the normalized vector of flux that passes through the Hall Effect sensor varies in a substantially linear manner along the path of the Hall Effect sensor. Consequently, the output voltage of the Hall Effect sensor bears a substantially linear relation to position and the output voltage varies substantially linearly between the extremes of relative movement between the sensor and the magnet.

It is a principal object of the invention to provide a position sensing arrangement in which the output of a sensor varies substantially linearly between the extreme end points of relative movement between the sensor and a permanent magnet.

It is another object of the invention to provide a position sensing arrangement in which a permanent magnet is magnetized to produce a flux field having a sensor responsive component or vector whose density or strength varies substantially linearly along the entire length of the magnet.

It is a further object of the invention to provide an improved position sensing arrangement having a permanent magnet that is magnetized and shaped to produce a plurality of different flux fields along the path of relative movement between a sensor and the permanent magnet.

It is also an object of the invention to provide an improved permanent magnet for use in a position sensing device.

DESCRIPTION OF A PREFERRED EMBODIMENT

Figure 1:
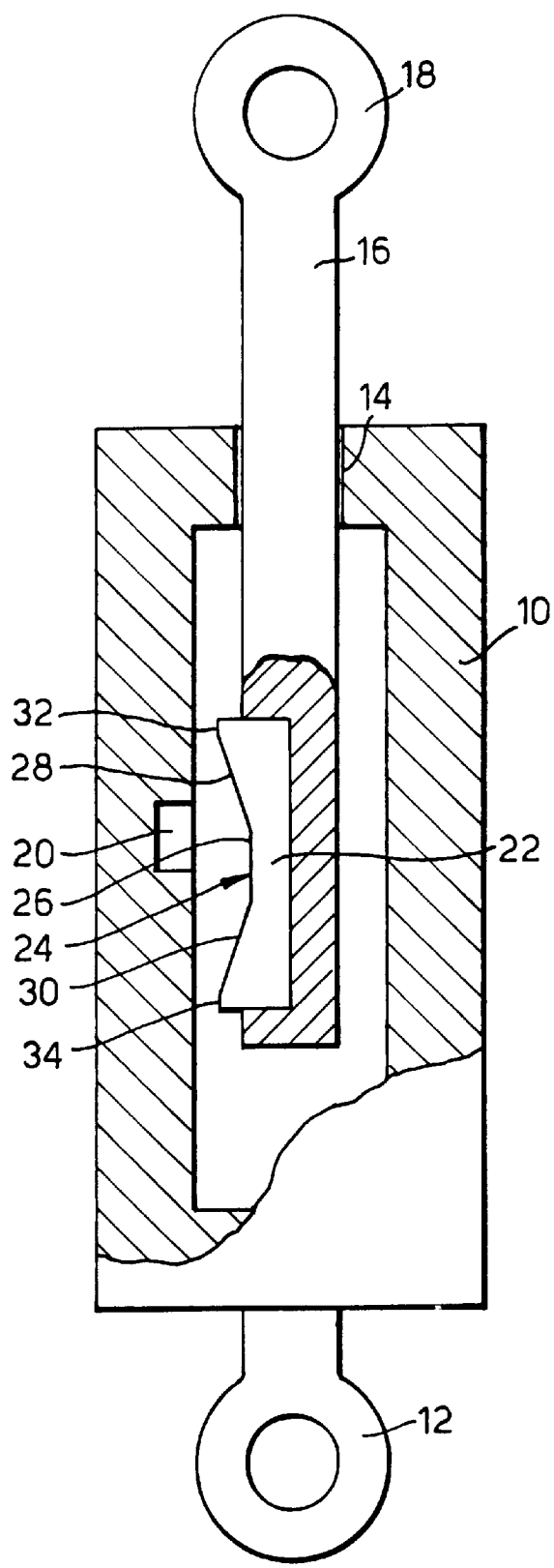
FIG. 1 is a partially broken-away view of a linear position sensor system in accordance with the invention.

FIG. 1 shows a linear position sensor system in accordance with the invention, comprising a hollow cylindrical housing 10 having a coupling eye 12 at one end, whereby it may be connected to one of the two members (not shown) whose relative position is to be measured. The housing 10 has a hole 14 at the end opposite to the coupling member 12. The hole 14 serves as a slide guide for a rod 16 which projects into the housing 10 and has a second wing coupling 18 on its outer end for connection of the two members whose relative position is to be sensed. In accordance with the invention, an analogue Hall Effect sensor 20 is embedded in the inner cylindrical wall of the housing 10 about half way along its length. The rod 16 carries an embedded permanent magnet 22 which is positioned with a front surface 24 confronting the Hall Effect sensor 20. The Hall Effect sensor 20 is preferably a so-called ratiometric Hall Effect sensor in which the output is linearly proportional both to the normal component of the flux vector passing through the sensing element and to the supply voltage. However, it will be recognized that sensors other than Hall Effect sensors that respond to magnetic flux may be used for some purposes.

The magnet 22 has a concavity or recess in its front surface 24 extending along the direction of relative movement between the sensor and the magnet. The concavity has a flat or plane central zone 26 extending parallel to the axis of the rod 16, on each end of which is a respective plane tapering intermediate zone 28, 30 and an end zone 32, 34 parallel to the central zone 26.

Figure 2:
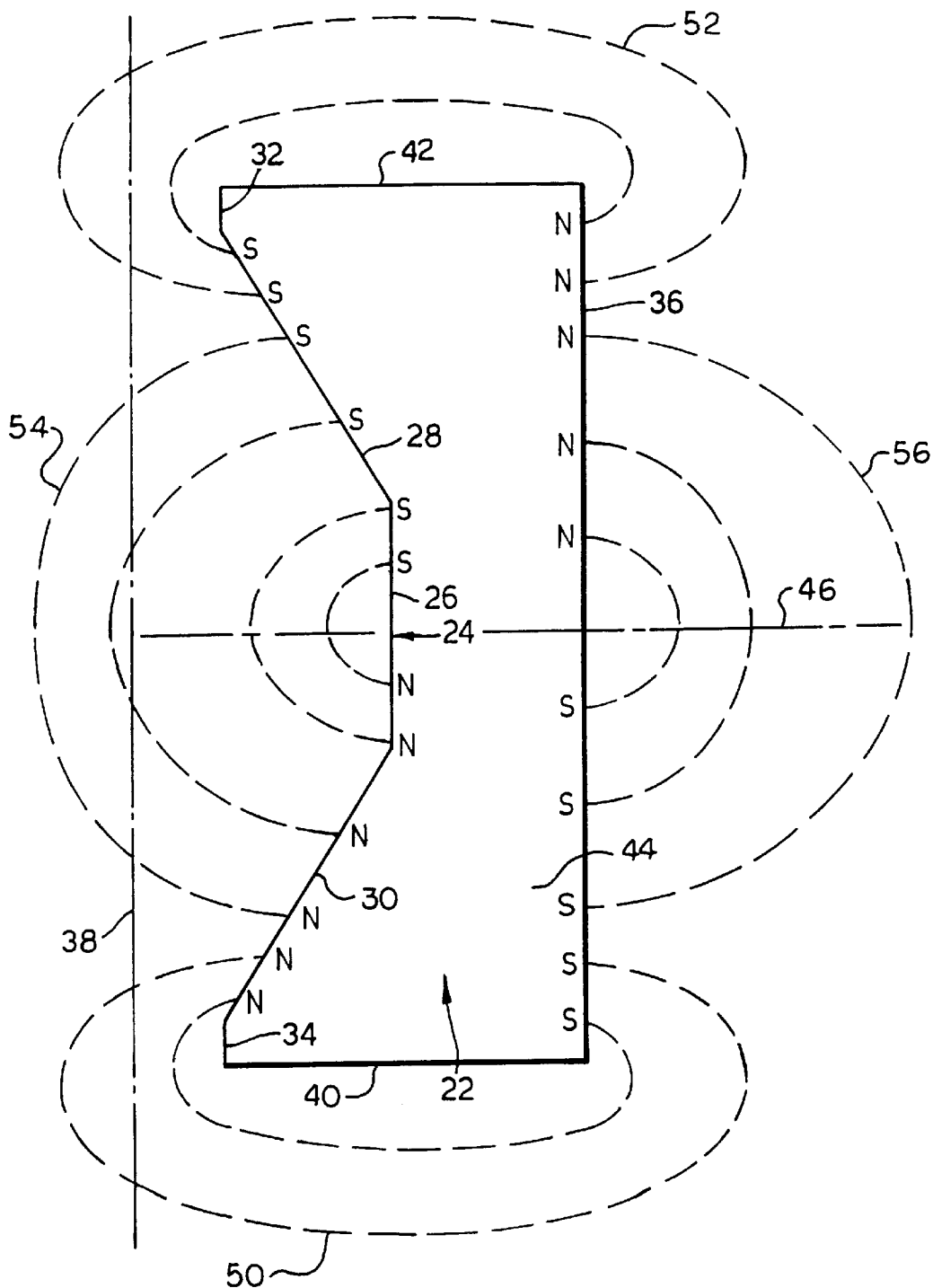
FIG. 2 is a flux diagram, on an enlarged scale, of a permanent magnet for the sensor system shown in FIG. 1.

FIG. 2 shows the magnet 22 on an enlarged scale with dotted lines representing lines of magnetic flux between respective magnetic poles designated N and S on its front surface 24 and corresponding poles of opposite polarity on its rear surface 36 opposite to the front surface. The path of the Hall Effect sensor is represented by a chain-dotted line 38.

It will be recognized that the dimensions of the magnet will vary from one application to another, and examples will be given simply by way of illustration and are not to be taken in a limiting sense. Satisfactory results have been achieved with a magnet of overall length 11.3 mm, width (perpendicular to the plane of FIG. 2) 3 mm, and maximum thickness 3.8 mm; the central zone 26 being of length 3.5 mm and having a thickness 2.1 mm, and the end zones 32 and 34 each being of length 0.4 mm. Such a magnet is suitable for use in a sensing system where the distance between the end zones 32, 34 and the sensing element of the Hall Effect sensor 20 is 1.25 mm.

Although other shapes are possible, the permanent magnet that is illustrated is a generally rectangular solid having parallel opposite ends 40, 42, front and rear faces 24, 36 and parallel opposite sides only one of which is illustrated at 44 in FIG. 2. Rear face 36 is substantially parallel to plane end surface portions 32 and 34 of front face 24, and also extends parallel to the direction of relative movement between the magnet and sensor. The permanent magnet has a length between opposite ends 40, 42 that generally corresponds to the distance between the extreme end points of relative movement between the permanent magnet and the sensor. In the thickness direction of the magnet between front and rear faces 24, 36, the magnet has a central longitudinal or magnetic axis 46. This axis is also parallel to the perpendicular components of the flux vectors to which the Hall Effect sensor responds. In the drawing, axis 46 also represents a midpoint of the magnet between opposite ends 40, 42, and lies in a plane that bisects magnet 22 between its ends 40, 42 and extends perpendicular to the direction of linear movement between the magnet and sensor.

The permanent magnet is magnetized in its thickness direction between front and rear faces 24, 36 and is magnetized in opposite directions on opposite sides of axis or midpoint 46. Thus, rear face 36 is a north magnetic pole between axis 46 and end 42, and is a south magnetic pole between axis 46 and end 40. Likewise, front face 24 is a north magnetic pole between axis 46 and end 40, and is a south magnetic pole between axis 46 and end 42. This magnetizing arrangement provides opposite end flux fields 50 and 52, and intermediate flux fields 54 and 56.

Flux field 50 extends outwardly beyond end 40 between north and south magnetic poles that are located on front face 24 adjacent end 40 and on rear face 36 adjacent end 40. The direction of end flux field 50 between the north and south poles is counterclockwise. Flux field 52 extends outwardly beyond end 42 between north and south magnetic poles that are respectively located on rear face 36 adjacent end 42 and on front face 24 adjacent end 42. Flux field 52 also extends counterclockwise between the north and south magnetic poles. However, the magnetic flux to which the sensor is exposed as it moves along path 38 is in opposite directions as between fields 50 and 52. The flux from magnetic field 50 that intersects the sensor is moving outwardly away from the north pole or from right-to-left in FIG. 2. In contrast, the flux from magnetic field 52 that intersects the sensor is moving back toward the south pole or from left-to-right in FIG. 2. Thus, field 50 may be considered as providing flux of a positive polarity that increases the output voltage of the sensor while field 52 provides flux of a negative polarity that decreases the output voltage of the sensor. Intermediate field 54 has no effect on the sensor when the sensor is aligned with axis 46 because the flux field at that point has no perpendicular component parallel to axis 46.

The flux fields 50, 52 and 54 have either clockwise or counterclockwise directions along the length of the magnet and along the path 38. In FIG. 2, both of end fields 50 and 52 have the same counterclockwise direction while intermediate field 54 has a clockwise direction.

As previously explained, the sensor normally is provided with an output voltage equal to approximately one-half of its maximum output voltage when it is not exposed to any flux whatsoever. When the sensor is located within flux field 50 along path 38 adjacent end 40, it will be producing maximum output voltage. As the magnet and sensor move relative to one another toward a position in which the sensor is aligned with axis 46, the sensor output voltage becomes smaller in a substantially linear manner because the perpendicular component of flux field 54 becomes smaller and smaller until it is zero at axis 46. At that point, the sensor output voltage is approximately one-half of the maximum output voltage.

On the opposite side of axis 46, that is between axis 46 and end 42, the flux acting on the sensor is negative so that the sensor output voltage gradually becomes smaller than one-half of its maximum output until it becomes zero when the sensor is located on path 38 within flux field 52 adjacent end 42.

Over the entire path of relative linear parallel movement between the magnet and sensor, the output voltage of the sensor varies substantially linearly from its maximum to its minimum values. Likewise, the vertical component of flux to which the sensor responds also varies substantially linearly between the opposite extreme end points of relative movement between the magnet and sensor. These advantageous concepts are illustrated in FIGS. 3 and 4.

Figure 3:
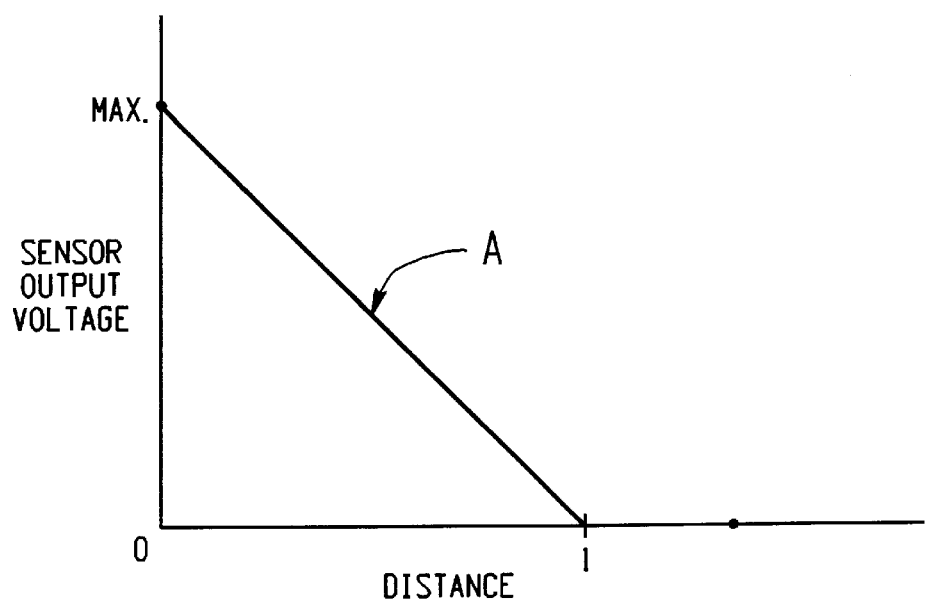
FIG. 3 is a graph showing the variation in sensor output with relative movement between sensor and magnet from one extreme of movement to the other.

In FIG. 3, the sensor output voltage is plotted on the vertical axis between zero and max, while distance between the extreme end points of relative movement between magnet and sensor are represented on the horizontal axis between zero and 1. As shown in FIG. 3, curve A representing sensor output with distance will be substantially linear with the arrangement of the present application. Obviously, some deviation from linearity can be expected in practice.

Figure 4:
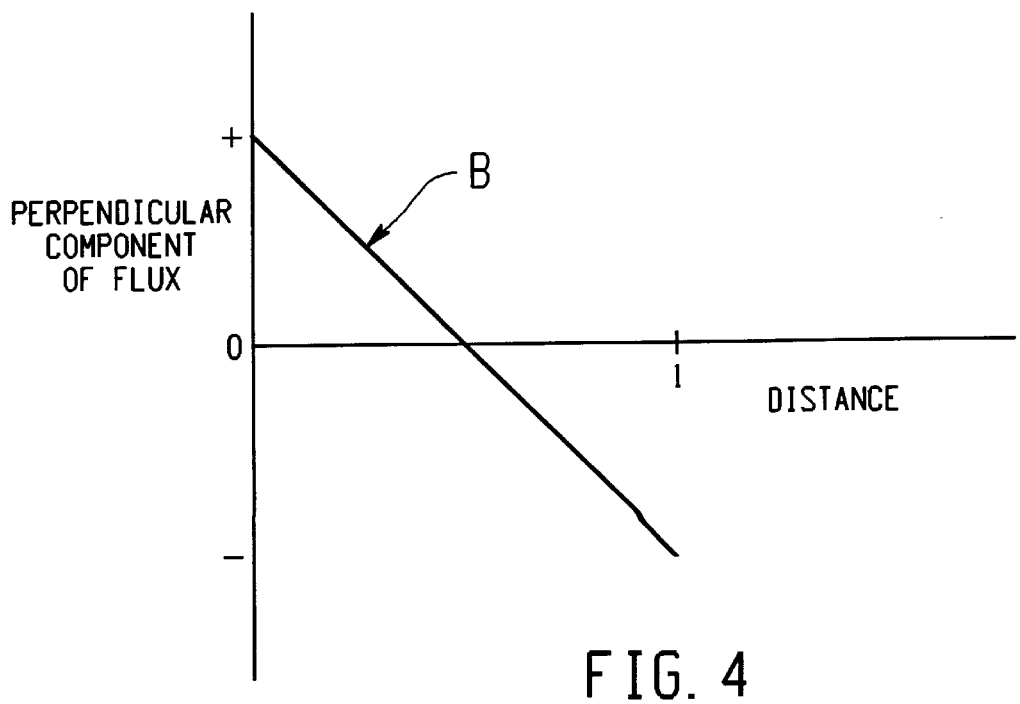
FIG. 4 is a graph showing the variation in the perpendicular component of magnetic flux to which the sensor responds with relative movement between sensor and magnet from one extreme of movement to the other.

FIG. 4 shows the strength or density of the perpendicular component of flux plotted on the vertical axis and the distance between extreme end points of relative movement between magnet and sensor represented by zero and 1. Curve B is also substantially linear although it will be recognized that some deviation from complete linearity can be expected in practice. The maximum perpendicular component of flux in FIG. 4 would occur within field 50 along path 38 while the most negative perpendicular component of flux illustrated in FIG. 4 would occur within end magnetic field 52 along path 38.

As shown in FIG. 2, permanent magnet 22 is magnetized to have like magnetic poles across diagonally opposite surface portions of front face 24 and rear face 36. Thus, the surface portion of rear face 36 located adjacent magnet end 42 is a north pole as is the diagonally opposite surface portion of front face 24 located adjacent magnet end 40. In the same manner, the diagonally opposite surface portion of rear face 36 located adjacent magnet end 40 is a south magnetic pole as is the surface portion of front face 24 located adjacent magnet end 42. The portions of flux field 54 located on opposite sides of axis 46 may be considered to have opposite polarity insofar as their effect on sensor output voltage is concerned. The portion of flux field 54 located between axis 46 and magnet end 40 is positive and increases the output voltage of the sensor. The portion of flux field 54 located between axis 46 and magnet end 42 is negative and reduces the output voltage of the sensor.

The length, depth and shape of the concave recess in magnet front face 24, along with the length of plane front end surfaces 32, 34, produces a field 54 that has a relationship to fields 50 and 52 for providing a substantially linear variation in the sensor output and in the perpendicular component of flux along the path of relative movement.

Sensor systems in accordance with the invention find particular application in rear view mirrors for motor vehicles of the type in which the orientation of the mirror housing is adjustable relative to the mirror housing by means of two screw jack drives arranged to adjust the orientation of the mirror glass about mutually orthogonal axes. A mirror assembly of this type is described in EP-A-0549173. A respective sensor system in accordance with the invention may be associated with each screw jack drive so as to provide an electrical signal indicating the actual position of the mirror glass. Such position sensor systems are required for use when such a mirror is used in conjunction with a system for storing a plurality of desired orientations for the mirror glass so that the mirror may be adjusted automatically in accordance with the requirements of a number of individual drivers.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only the by scope of the claims.

What is claimed is:

1. A sensor system for measuring linear displacement of a first member relative to a second member in a linear direction of relative movement comprising:

an analogue Hall Effect sensor secured to the first member in an orientation to sense magnetic flux in a sensing direction perpendicular to said direction of relative movement, a permanent magnet secured to the second member and having a front surface that faces the Hall Effect sensor and extends along the direction of relative movement between the first and second members, the permanent magnet having opposite ends spaced-apart in said direction of relative movement, the permanent magnet being magnetized to have a magnetic pole of one magnetic polarity on said front surface adjacent one of said opposite ends and a second magnetic pole of an opposite magnetic polarity on said front surface adjacent the other of said opposite ends.

2. A sensor system according to claim 1 including a rear surface opposite to said front surface, said rear surface having a magnetic pole thereon adjacent said one end of said magnet that is of opposite magnetic polarity to said magnetic pole on said front surface adjacent said one end, and said rear surface having a magnetic pole thereon adjacent said other end of said magnet that is of opposite magnetic polarity to said magnetic pole on said front surface adjacent said other end.

3. A sensor system according to claim 1, wherein the front surface is of constant width between said magnet opposite ends in a direction perpendicular both to said direction of relative movement and to said sensing direction.

4. A sensor system according to claim 1, wherein said front surface is concave intermediate said magnet opposite ends in the direction of relative movement between the first and second members and is shaped to cause the density of the flux to which the sensor responds to vary in a substantially linear manner along the path of relative movement between the Hall Effect sensor and the magnet.

5. A sensor system according to claim 4, wherein the concave front surface includes a central portion comprising a plane surface perpendicular to the magnetic axis of said permanent magnet and parallel to said direction of relative movement between said first and second members.

6. A sensor system according to claim 5, wherein the front surface at opposite ends of the concave front surface includes two end portions comprising plane surfaces perpendicular to the magnetic axis and parallel to said direction of relative movement between said first and second members.

7. A sensor system according to claim 6, wherein the concave front surface includes two intermediate portions on opposite sides of the central portion, inclined at opposite angles to the magnetic axis.

8. A sensor system according to claim 7, wherein the intermediate portions comprise plane surfaces.

9. A sensor system according to claim 5, wherein the concave front surface includes two intermediate portions on opposite sides of the central portion, inclined at opposite angles to the magnetic axis.

10. A sensor system according to claim 9, wherein the intermediate portions comprise plane surfaces.

11. A sensor system according to claim 4, including a rear surface opposite to said front surface, said rear surface having a magnetic pole thereon adjacent said one end of said magnet that is of opposite magnetic polarity to said magnetic pole on said front surface adjacent said one end, and said rear surface having a magnetic pole thereon adjacent said other end of said magnet that is of opposite magnetic polarity to said magnetic pole on said front surface adjacent said other end.

12. A sensor system according to claim 4, wherein the front surface is of constant width between said magnet opposite ends in a direction perpendicular both to said direction of relative movement and to said sensing direction.

13. In a position sensing device including a permanent magnet and a sensor relatively movable parallel to one another, said magnet having opposite ends and a length between said opposite ends in the direction of relative movement between said magnet and sensor, said magnet having a front face that faces toward said sensor, said magnet being magnetized to provide magnetic flux extending outwardly from said front face that includes at least three flux fields providing sensor responsive flux to which said sensor responds, and said magnetic flux providing sensor responsive flux in said at least three flux fields with a density that varies substantially linearly along said length of said magnet.

14. The device of claim 13 wherein said magnetic flux includes three flux fields spaced along said length of said magnet.

15. The device of claim 13 wherein said front face has a concave recess therein spaced inwardly from said ends, said recess having plane surfaces and said front face having plane surface end portions outwardly of said recess that extend parallel to the direction of relative movement between said sensor and said magnet.

16. In a position sensing device including a permanent magnet and a sensor relatively movable parallel to one another, said magnet having opposite ends and a length between said opposite ends in the direction of relative movement between said magnet and sensor, said magnet having a front face that faces toward said sensor, said magnet being magnetized to provide at least three flux fields extending outwardly from said front face along said length and to which said sensor responds, and said at least three magnetic flux fields being shaped to provide said sensor with an output that varies substantially linearly along said length of said magnet.

17. A permanent magnet having front and rear faces and opposite ends, a thickness dimension between said front and rear faces, and a length between said opposite ends, said magnet being magnetized in the direction of said thickness dimension to provide magnetic poles on said front and rear faces, said magnetic poles being positioned and having a polarity to provide at least three different flux fields extending outwardly from said front face along said length.

18. The magnet of claim 17 wherein said flux fields include end flux fields of opposite polarity adjacent said opposite ends and an intermediate flux field having the same polarity as one of said end flux fields.

19. The magnet of claim 17 wherein said flux fields extend in clockwise or counterclockwise directions along said magnet length and include end flux fields and an intermediate flux field, both of said end flux fields being in one of said directions and said intermediate field being in the other of said directions.

20. The magnet of claim 19 wherein said end flux fields are of opposite polarity.

21. The magnet of claim 17 wherein said front face has plane front surfaces adjacent said opposite ends and a concave recess between said plane front surfaces.

22. A permanent magnet having opposite front and rear faces, opposite ends, and a midpoint that is midway between said opposite ends, said magnet being magnetized to have a north magnetic pole on said rear face and a south magnetic pole on said front face between said midpoint and one of said ends and to have a south magnetic pole on said rear face and a north magnetic pole on said front face between said midpoint and the other of said ends, said poles providing end flux fields of opposite polarity that extend outwardly of said ends between end surface portions of said front and rear faces, and said poles providing intermediate flux fields that extend outwardly from said front and rear faces across said midpoint between intermediate portions of said front and rear faces located on opposite sides of said midpoint.

23. The magnet of claim 22 wherein said front face has a central concave recess therein extending in a direction between said opposite ends, said recess having a plane central surface and plane inclined surfaces that extend from said central surface to intersections with said front face that are spaced inwardly from said opposite ends of said magnet.

* * * * *